US011961497B2

(12) United States Patent
Mancke

(10) Patent No.: US 11,961,497 B2
(45) Date of Patent: Apr. 16, 2024

(54) HEADJOINT FOR A FLUTE AND ALTO FLUTE SET

(71) Applicant: Tobias Mancke, Speicher (DE)

(72) Inventor: Tobias Mancke, Speicher (DE)

( * ) Notice: Subject to any disclaimer, the term of this patent is extended or adjusted under 35 U.S.C. 154(b) by 4 days.

(21) Appl. No.: 17/851,012

(22) Filed: Jun. 27, 2022

(65) Prior Publication Data

US 2023/0419925 A1 Dec. 28, 2023

(51) Int. Cl.
*G10D 9/02* (2020.01)
*G10D 7/026* (2020.01)

(52) U.S. Cl.
CPC ............... *G10D 9/02* (2013.01); *G10D 7/026* (2013.01)

(58) Field of Classification Search
CPC ............ G10D 9/02; G10D 7/026; G10D 9/00; G10D 7/00
See application file for complete search history.

(56) References Cited

U.S. PATENT DOCUMENTS

2015/0294654 A1 10/2015 Mancke
2019/0180724 A1 6/2019 Marius

FOREIGN PATENT DOCUMENTS

CA 3162925 A1 6/2021
EP 2237265 A1 10/2010
EP 2237265 A1 * 10/2010 ............. G10D 7/026

OTHER PUBLICATIONS

"Extended European Search Report for European Patent Application No. 23181154.8", Mailed Date: Oct. 23, 2023, 9 pages.
Jupiter, "Catalog", Retrieved at: <<https://www.jupiter.info/fileadmin/_jupiter/Katalog/JP_Katalog_2017_LoRes_V2.pdf>>, Retrieved Date: Jan. 21, 2020, Aug. 8, 2017, 68 pages.

* cited by examiner

*Primary Examiner* — Kimberly R Lockett
(74) *Attorney, Agent, or Firm* — Calfee, Halter & Griswold LLP

(57) ABSTRACT

The invention relates to an alto flute set having a flute body (5) with tone holes, one mouthpiece (1), a straight extension (3) connectable to the flute body (5) and to the one mouthpiece (1), a curved extension (4) connectable to the flute body (5) and to the one mouthpiece (1).

12 Claims, 3 Drawing Sheets

HEADJOINT FOR A FLUTE AND ALTO FLUTE SET

Figure 1:
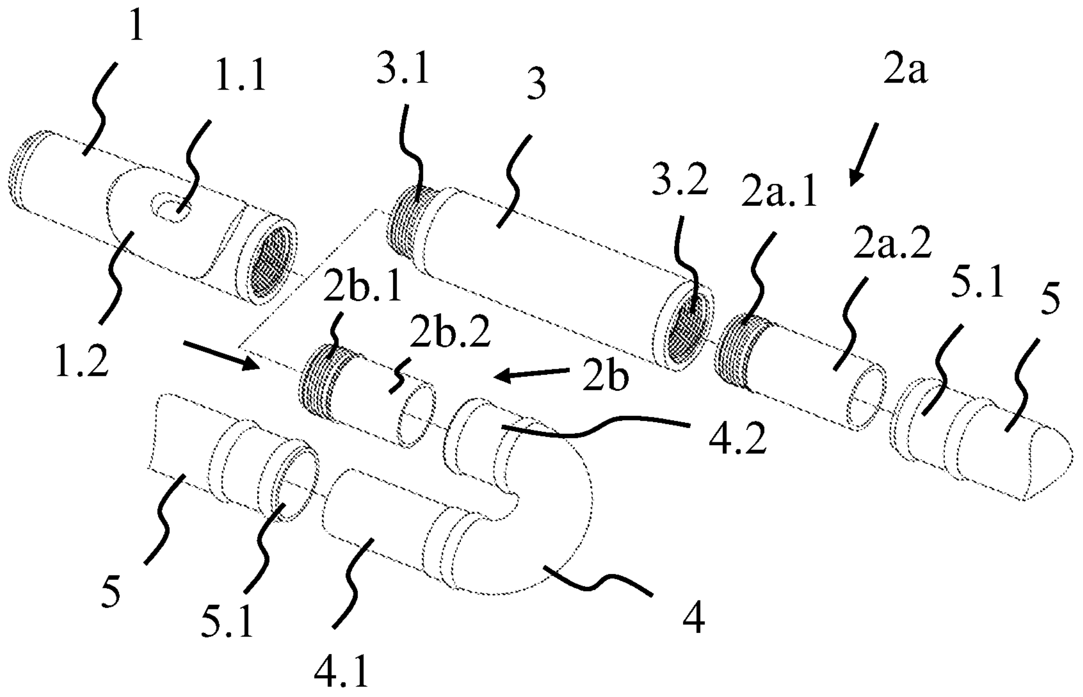

The present invention relates to transverse flutes and in particular to alto flutes as well as to headjoints for transverse flutes.

An alto flute comprises a flute body with tone holes and a headjoint, wherein the headjoint can be connected to the flute body by a releasable sliding connection. For the sliding connection a kind of a press-fit connection is provided between the headjoint and the flute body so that the headjoint can be slid into and out from the flute body. With other words: the flute body and the headjoint are connected to one another by means of tube pieces formed, respectively on the flute body and the headjoint, which tube pieces are insertable into one another, and whereby the flute body and headjoint are displaceable relative to one another based on the tube pieces slidingly arranged in one another.

An alto flute usually has two types of headjoints, namely a straight headjoint and a curved headjoint. The straight single pieced headjoint extends linearly in one direction, wherein in the assembled state the straight headjoint and the flute body extend in the same direction. When the alto flute is assembled with the straight headjoint, the alto flute has a considerably large overall length so that in particular smaller players have to stretch their arms extremely in order to play the alto flute. The curved headjoint comprises a curved extension with a bend of about 180 degrees. This way, in the assembled state the overall length of the alto flute is smaller, so that it can be played in a more comfortable way.

Accordingly, the known alto flute sets having the two types of headjoints comprise two parts with an embouchure hole with the surrounding lip plate. In case of the straight headjoint, the embouchure hole and the lip plate are formed on the linearly extending headjoint. In case of the curved headjoint, a mouthpiece having the embouchure hole and the lip plate is connected with a tube in tube sliding connection to the curved extension. As each of the headjoints are only played from its one specific side, the lip plates are formed asymmetrically with regard to the longitudinal axis. As the embouchure hole and the lip plate are one of the most work-intensive sections during the production of the alto flute, the manufacturing of an alto flute is effortful.

In view of the foregoing, it is an object of the present invention to provide a headjoint for a transverse flute and an alto flute set, which can be produced more easily and inexpensively.

The object is in particular solved by the subject matter of the independent claims. Preferred embodiments are described in the dependent claims and in the before and following description, wherein single features of the preferred embodiments can be combined with each other in a technically meaningful manner. In particular, features and advantages described with regard to the headjoint can be applied to the alto flute set and vice versa.

For solving this object, it is suggested that a headjoint for a transverse flute has a mouthpiece, at least one adapter piece, the adapter piece comprising a first connection section releasably connectable to the mouthpiece and a second connection section slidably connectable to a flute component, wherein in a state, when the second connection section is connected to the flute component, the second connection section is surrounded only by the flute component.

With other words: It is suggested that the headjoint of a transverse flute comprises a mouthpiece having the embouchure hole and the lip plate and an adapter piece, which can be interchangeably connected to the mouthpiece. For interchangeably (directly or indirectly) connecting the adapter piece to the mouthpiece, the adapter piece has the first connection section. When the flute is assembled, the second connection section of the adapter piece is slid into the flute component. The flute component may be the flute body or any other component of the headjoint. In the assembled state, the second connection section is only surrounded by this flute component and not by any other component of the flute and in particular not by any other component of the headjoint.

In contrast thereto, prior art document US 2015/0294654 A1 discloses a headjoint for a piccolo, wherein in addition to an adapter piece the headjoint always needs to have an adapter socket surrounding the adapter piece. In an assembled state, the adapter piece is inserted into the flute body of the piccolo, whereas the adapter socket surrounds the flute body on the outside. Accordingly, in the assembled state the connection section of the adapter piece slid into the flute body is surrounded by the flute body as well as by the adapter socket. In regard to piccolos it is to note, that there is no standardization of the flute bodies and the headjoints, so that each manufacturer can choose the inner diameter of the flute body. Accordingly, headjoints of one manufacturer of piccolos can not be used with the flute body of another manufacturer.

The headjoint is in particular used with a transverse flute, which has a flute body with tone holes and an inventive headjoint.

In a preferred embodiment, the first connection section of the adapter piece is connected to the mouthpiece by a thread connection. For example, the first connection section of the adapter piece may comprise an outer thread and the mouthpiece comprises an inner thread, into which the adapter piece can be screwed with its first connection section for a direct connection.

Alternatively, a press-fit connection may be embodied between the first connection section of the adapter piece and the mouthpiece. Accordingly, an outer diameter of the first connection section is adapted to the inner diameter of the mouthpiece, so that the first connection section can be slid into the mouthpiece for a releasable and direct connection.

The second connection section is embodied to be slidably connected to a flute component. In particular, the second connection section may be slidably connectable to the flute body or to a curved extension of the headjoint. In this regard, the second connection section is preferably embodied with its outer diameter in such a way that it can be press-fitted into the respective other flute component, which has a respective inner diameter. Accordingly, in case a headjoint is to be used with different flute components and/or with different flute bodies, according to one aspect of the invention a headjoint set is suggested, which has an inventive headjoint, wherein the headjoint set has at least a first adapter piece and a second adapter piece, wherein the first adapter piece differs from the second adapter piece in the outer diameter and/or length of the second connection section.

In one embodiment, the headjoint comprises a straight extension, which is connectable directly to the mouthpiece at its one end and which is connectable directly to an adapter piece at its other end. In this case, the adapter piece is indirectly releasable connectable to the mouthpiece. For example, the first connection section of the straight extension may comprise an outer thread, which can be directly screwed into an inner thread of the mouthpiece, while the other connection section of the straight extension comprises an inner thread, in which the outer thread of the first connection section of the adapter piece can be screwed directly.

Accordingly, also a flute is suggested, wherein the second connection section of the adapter piece is slid into the flute body and surrounded only by the flute body.

In a further embodiment, the headjoint may comprise a curved extension into which the second connection section of an adapter piece can be slid. Accordingly, the second connection section of a respective adapter piece is embodied to be slidably engageable with a receiving section of the curved extension.

As the receiving section of the flute body and the receiving section of the curved extension may differ in their diameter and/or length from each other, in a preferred embodiment it is suggested, that the headjoint set comprises a first adapter piece, which second connection section is adapted to be slidably engageable with a flute body and wherein a second connection section of a second adapter piece is embodied to be slidably engageable into a curved extension of the flute.

Accordingly, also a flute is suggested, wherein the second connection section of the adapter piece is slid into a curved extension of the headjoint and surrounded only by the curved extension, wherein a connection section of the curved extension is slid into the flute body.

The above object is also solved by an alto flute set having a flute body with tone holes, exactly one mouthpiece, a straight extension connectable to the flute body and to the one mouthpiece, and a curved extension connectable to the flute body and to the one mouthpiece.

With other words: According to this aspect of the invention, it is suggested that an alto flute set has only exactly one mouthpiece which can be interchangeably connected with the flute body via a straight extension or via a curved extension. In a specific embodiment of this aspect of the invention, the exactly one mouthpiece may be connected to the flute body via a straight extension and a first adapter piece and the exactly one mouthpiece may be connected to the curved extension via a second adapter piece. Accordingly, an alto flute set does not need to have two mouthpieces each having an embouchure hole and a lip plate. In contrast, the alto flute set according to the present invention has only one mouthpiece, so that the embouchure hole and the surrounding lip plate only need to be manufactured once.

In this regard, also an alto flute set is suggested, which comprises at least a first adapter piece and a second adapter piece, the first adapter piece comprising a first connection section releasably connectable to the mouthpiece or to the straight extension and a second connection section slidably connectable to the flute body, wherein the second adapter piece comprises a first connection section releasably connectable to the mouthpiece and a second connection section slidably connectable to the curved extension. Such an alto flute set can be assembled in two configurations. According to the first configuration, the first adapter piece is directly connected to the straight extension and to the flute body, whereas the straight extension is directly connected to the mouthpiece. According to the second configuration, the second adapter piece is directly connected to the mouthpiece and to the curved extension, whereas the curved extension is directly connected to the flute body.

In order that exactly one mouthpiece can be used with the straight extension as well as with the curved extension, it is suggested that the lip plate is symmetrically shaped with regard to the embouchure hole. The lip plate is a section of the mouthpiece which surrounds the embouchure hole and which protrudes in a radial direction over the remaining surface of the mouthpiece. The lip plate is in particular symmetrical to a (imaginary) plane, which plane is defined by a longitudinal axis of the mouthpiece and a line extending through the embouchure hole and being parallel to the longitudinal central axis of the mouthpiece. Accordingly, the embouchure hole can be played from both sides, so that the mouthpiece can be used when the transverse flute is assembled with the straight extension as well as when the flute is assembled with the curved extension.

Figure 2:
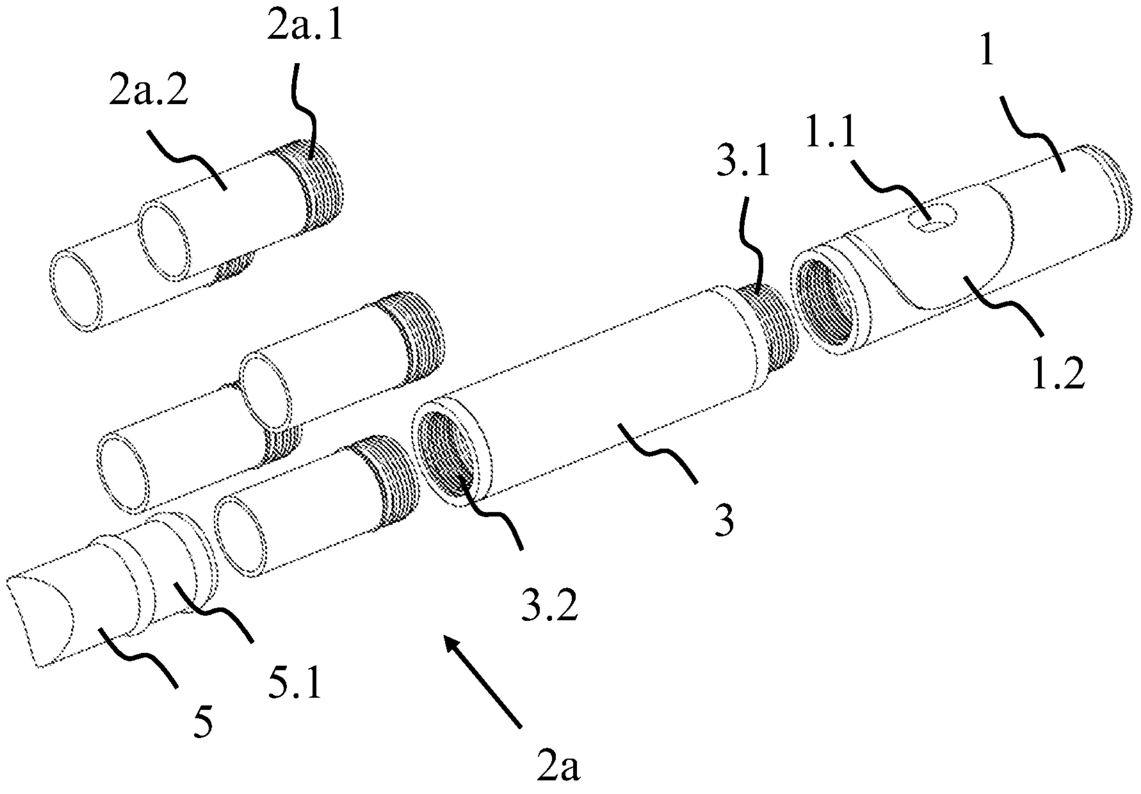
Figure 3:
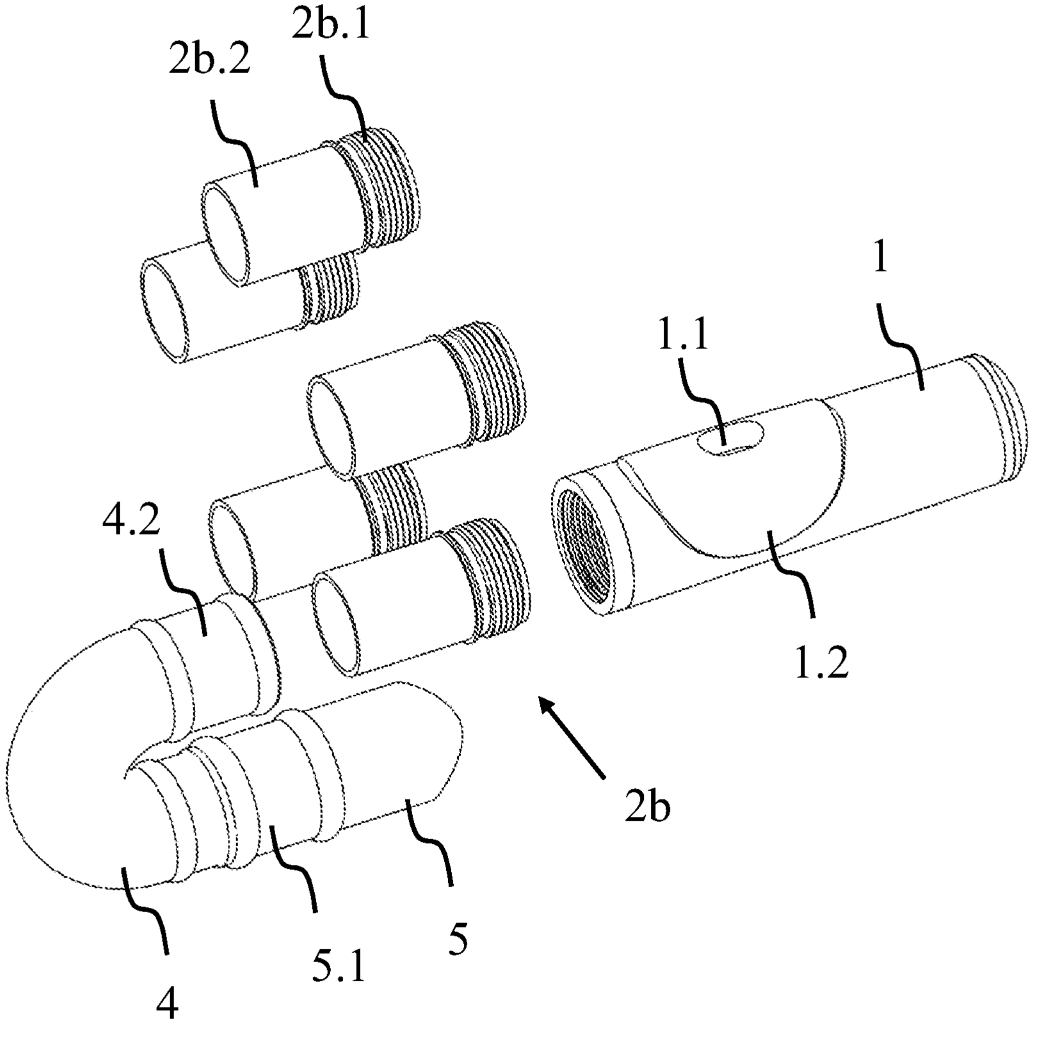

The invention and the technical background will now be described with regard to the figures. The figures show schematically FIG. 1: an alto flute set;

FIG. 2: a straight headjoint for an alto flute set with multiple adapter pieces;

FIG. 3: a curved headjoint for an alto flute with multiple adapter pieces.

FIG. 1 shows an alto flute set. The alto flute set comprises a mouthpiece 1 and a flute body 5, which flute body 5 is only depicted partly. A receiving section 5.1 of the flute body is shown.

The mouthpiece 1 comprises an embouchure hole 1.1, which embouchure hole 1.1 is surrounded by a lip plate 1.2. The lip plate 1.2 is formed in a symmetric manner with regard to the embouchure hole 1.1, so that the mouthpiece 1 can be played from both sides of the embouchure hole 1.1.

The mouthpiece 1 can be connected to the flute body 5 via a straight extension 3 or via a curved extension 4.

The alto flute set further comprises a first adapter piece **2*a*, which has a first connection section 2*a*.1 and a second connection section 2*a*.2**.

Furthermore, the alto flute set comprises a second adapter piece **2*b*, which has a first connection section 2*b*.1 and a second connection section 2*b*.2**.

In case the mouthpiece 1 is connected to the flute body 5 via the straight extension 3, the straight extension 3 is screwed into the mouthpiece 1 with its first end 3.1 and the first connection section **2*a*.1 of the first adapter piece 2*a* is screwed into a second end 3.2 of the straight extension 3. Furthermore, the second connection section 2*a*.2 of the first adapter piece 2*a* is slidingly engaged into a respective receiving section 5.1 of the flute body 5, so that a kind of a press-fit connection is provided between the first adapter piece 2*a* and the flute body 5**.

In case the mouthpiece 1 is connected to the flute body 5 via the curved extension 4, the second adapter piece **2*b* is screwed into the mouthpiece 1 with its first connection section 2*b*.1. The second connection section 2*b*.2 of the second adapter piece 2*b* is slidingly engaged into a receiving section 4.2 of the curved extension 4. Accordingly, a kind of a press-fit connection is provided between the second adapter piece 2*b* and the curved extension 4. Furthermore, a connection section 4.1 of the curved extension is slidingly engaged into the receiving section 5.1 of the flute body 5**.

When the second connection sections **2*a*.2 and 2*b*.2 are inserted into the receiving section 4.2, 5.1 of the flute body 5 or the curved extension 4, they are only surrounded by the respective flute component (flute body 5 or curved extension 4**) and by no further component of the flute.

The first connection section **2*b*.1 of the second adapter piece 2*b* as well as the connection section at the first end 3.1 of the straight extension 3 are embodied the same, so that they can be screwed into the inner thread of the mouthpiece 1. The first connection section 2*a*.1 of the first adapter piece 2*a* is embodied to be screwed into an inner thread formed at the second end 3.2 on the straight extension 3. In an alternative (not shown) embodiment, the connection sections may be embodied to provide a press-fit connection similar to the connection between the second connection sections 2***a*.2 and 2*b*.2 and the receiving section 5.1, 4.2 of the flute body 5 and the curved extension 4, respectively.

As the receiving section 5.1 of the flute body 5 differs from the receiving 4.2 section of the curved extension 4, the second connection section 2*a*.2 of the first adapter piece 2*a* differs from the second connection section 2*b*.2 of the second adapter piece 2*b* in length and outer diameter.

As the exactly one mouthpiece 1 can be connected to the flute body 5 via the straight extension 3 and also via the curved extension 4, only one mouthpiece 1 needs to be provided for each alto flute set. Accordingly, when manufacturing the alto flute set, only one embouchure hole 1.1 and one lip plate 1.2 need to be manufactured. Furthermore, the mouthpiece 1 can be used with a different flute bodies 5 and different curved extensions 4 belonging to the different flute bodies 5 by changing the adapter pieces 2*a* and 2*b* and the straight extension 3.

FIG. 2 depicts a configuration, in which the mouthpiece 1 can be connected to the flute body 5 via multiple first adapter pieces 2*a*. The system of connecting one mouthpiece 1 to different flute bodies 5 is also applicable with other transverse flutes. In case different manufacturers of transverse flutes provide the flute body 5 with different diameters of the receiving section 5.1, a specific mouthpiece 1 can be used with different flute bodies by interchanging the first adapter piece 2*a* and the straight extension 3. The adapter piece 2*a* can be easily interchanged. Furthermore, manufacturing a respective adapter piece is much easier than manufacturing a whole headjoint (with the embouchure hole and the lip plate) as a single piece.

FIG. 3 depicts the one mouthpiece 1 being connectable to the curved extension 4 via different second adapter pieces 2*b*. Also in this case, the second adapter pieces 2*b* may be interchanged to be used with multiple curved extensions 4, which differ from each other in the dimension of the receiving section 4.2.

REFERENCE SIGNS

1 mouthpiece
1.1 embouchure hole
1.2 lip plate
2*a* first adapter piece
2*a*.1 first connection section
2*a*.2 second connection section
2*b* first adapter piece
2*b*.1 first connection section
2*b*.2 second connection section
3 straight extension
3.1 first end
3.2 second end
4 curved extension
4.1 connection section
4.2 receiving section
5 flute body
5.1 receiving section

The invention claimed is:

1. Headjoint for a transverse flute having
a mouthpiece (1),
at least one adapter piece (2*a*, 2*b*), the adapter piece (2*a*, 2*b*) comprising
a first connection section (2*a*.1, 2*b*.1) releasably connectable to the mouthpiece (1) and
a second connection section (2*a*.2, 2*b*.2) slidably connectable to a flute component,
characterized in that in a state, when the second connection section (2*a*.2, 2*b*.2) is connected to the flute component, the second connection section (2*a*.2, 2*b*.2) is surrounded only by the flute component, wherein the mouthpiece (1) has an embouchure hole (1.1) surrounded by a lip plate (1.2), wherein the lip plate (1.2) is symmetrical to a plane defined by a longitudinal axis of the mouthpiece (1) and a line extending through the embouchure hole (1.1) and being parallel to the longitudinal axis of the mouthpiece (1).

2. Headjoint according to claim 1, wherein the first connection section (2*a*.1, 2*b*.1) of the adapter piece (2*a*, 2*b*) comprises a thread.

3. Headjoint according to claim 1, wherein the mouthpiece (1) comprises a thread.

4. Headjoint according to claim 1, wherein the headjoint comprises a straight extension (3) connectable at its first end (3.1) to the mouthpiece (1) and at its second end (3.2) to the adapter piece (2*a*).

5. Headjoint according to claim 1, wherein the headjoint comprises a curved extension (4) as a further flute component into which the second connection section (2*b*.2) of the adapter piece (2*b*) is able to be slid.

6. Headjoint set comprising:
a headjoint for a transverse flute having
a mouthpiece (1),
at least one adapter piece (2*a*, 2*b*), the adapter piece (2*a*, 2*b*) comprising
a first connection section (2*a*.1, 2*b*.1) releasably connectable to the mouthpiece (1)
a second connection section (2*a*.2, 2*b*.2) slidably connectable to a flute component, and
at least a first adapter piece (2*a*) and a second adapter piece (2*b*), wherein the first adapter piece (2*a*) differs from the second adapter piece (2*b*) in the diameter and/or length of the second connection section (2*a*.2, 2*b*.2),
characterized in that in a state, when the second connection section (2*a*.2, 2*b*.2) is connected to the flute component, the second connection section (2*a*.2, 2*b*.2) is surrounded only by the flute component.

7. Transverse flute, in particular an alto flute, having
a flute body (5) with tone holes and
a headjoint having
a mouthpiece (1),
at least one adapter piece (2*a*, 2*b*), the adapter piece (2*a*, 2*b*) comprising
a first connection section (2*a*.1, 2*b*.1) releasably connectable to the mouthpiece (1) and
a second connection section (2*a*.2, 2*b*.2) slidably connectable to a flute component,
characterized in that in a state, when the second connection section (2*a*.2, 2*b*.2) is connected to the flute component, the second connection section (2*a*.2, 2*b*.2) is surrounded only by the flute component.

8. Flute according to claim 7, wherein the second connection section (2*a*.2) of the adapter piece (2*a*) is slid into the flute body (5) and surrounded only by the flute body (5).

9. Flute according to claim 7, wherein the second connection section (2*b*.2) of the adapter piece (2*b*) is slid into a curved extension (4) of the headjoint and surrounded only by the curved extension (4), wherein a connection section (4.1) of the curved extension (4) is slid into the flute body (5).

10. Transverse flute set having
a flute body (5) with tone holes,
one mouthpiece (1),
a straight extension (3) connectable to the flute body (5) and to the one mouthpiece (1),
a curved extension (4) connectable to the flute body (5) and to the one mouthpiece (1), wherein the mouthpiece (1) has an embouchure hole (1.1) surrounded by a lip plate (1.2), wherein the lip plate (1.2) is symmetrical to a plane defined by a longitudinal axis of the mouthpiece (1) and a line extending through the embouchure hole (1.1) and being parallel to the longitudinal axis of the mouthpiece (1).

11. Transverse flute set according to claim 10, wherein the alto flute set comprises at least a first adapter piece (2*a*) and a second adapter piece (2*b*), the first adapter piece (2*a*) comprising
a first connection section (2*a*.1) releasably connectable to the straight extension (3) and
a second connection section (2*a*.2) slidably connectable to the flute body (5),
the second adapter piece (2*b*) comprising
a first connection section (2*b*.1) releasably connectable to the mouthpiece (1) and
a second connection section (2*b*.2) slidably connectable to the curved extension (4).

12. Transverse flute set according to claim 11, wherein either
the first adapter piece (2*a*) is connected to the straight extension (3) and to the flute body (5), in which case the straight extension (3) is connected to the mouthpiece (1), or
the second adapter piece (2*b*) is connected to the mouthpiece (1) and to the curved extension (4), in which case the curved extension (4) is connected to the flute body (5).

* * * * *